United States Patent
Okuyama (10) Patent No.: US 7,076,583 B2
(45) Date of Patent: Jul. 11, 2006

(54) MULTIPROCESSOR SYSTEM, SHARED-MEMORY CONTROLLING METHOD, RECORDING MEDIUM AND DATA SIGNAL EMBEDDED IN A CARRIER WAVE

(75) Inventor: Hideki Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 475 days.

(21) Appl. No.: 10/077,947

(22) Filed: Feb. 20, 2002

(65) Prior Publication Data

US 2002/0116469 A1  Aug. 22, 2002

(30) Foreign Application Priority Data

Feb. 20, 2001  (JP)  ............... 2001-043855

(51) Int. Cl.
  *G06F 13/10*  (2006.01)
(52) U.S. Cl. ........................... 710/107; 711/147
(58) Field of Classification Search ............. 711/147, 711/148; 710/107, 113, 305, 240, 241
  See application file for complete search history.

(56) References Cited

U.S. PATENT DOCUMENTS

| | | | | |
|---|---|---|---|---|
| 4,984,153 | A | * | 1/1991 | Kregness et al. ........... 711/152 |
| 5,235,700 | A | * | 8/1993 | Alaiwan et al. ............ 714/13 |
| 5,339,427 | A | * | 8/1994 | Elko et al. ................. 718/103 |
| 5,418,913 | A | * | 5/1995 | Fujimoto ................... 709/213 |
| 5,442,755 | A | * | 8/1995 | Shibata .................... 710/108 |
| 5,737,514 | A | * | 4/1998 | Stiffler .................... 714/13 |
| 5,813,016 | A | * | 9/1998 | Sumimoto ................. 707/201 |
| 5,884,046 | A | * | 3/1999 | Antonov ................... 709/238 |
| 5,978,839 | A | * | 11/1999 | Okuhara et al. ........... 709/215 |
| 5,983,359 | A | * | 11/1999 | Nota et al. ................. 714/10 |
| 6,035,417 | A | * | 3/2000 | Kanazawa .................. 714/13 |
| 6,173,375 | B1 | * | 1/2001 | Arshad ...................... 711/152 |
| 6,237,108 | B1 | * | 5/2001 | Ogawa et al. .............. 714/6 |
| 6,253,290 | B1 | * | 6/2001 | Nakamoto ................. 711/138 |
| 6,496,890 | B1 | * | 12/2002 | Azevedo et al. ........... 710/110 |
| 6,587,904 | B1 | * | 7/2003 | Hauck et al. .............. 710/107 |
| 6,609,214 | B1 | * | 8/2003 | Dahlen et al. ............. 714/5 |
| 6,704,798 | B1 | * | 3/2004 | Mogul ...................... 709/246 |
| 6,715,059 | B1 | * | 3/2004 | Miller ...................... 711/220 |

FOREIGN PATENT DOCUMENTS

| | | |
|---|---|---|
| JP | 03-54660 | 3/1991 |
| JP | 04-291085 | 10/1992 |
| JP | 5-81207 | 4/1993 |
| JP | 6-161975 | 6/1994 |
| JP | 6-342382 | 12/1994 |
| JP | 8-153080 | 6/1996 |
| JP | 9-282291 | 10/1997 |

\* cited by examiner

*Primary Examiner*—Rehana Perveen
*Assistant Examiner*—Trisha Vu
(74) *Attorney, Agent, or Firm*—Young & Thompson (57) ABSTRACT

A multiprocessor system includes a plurality of processors, a shared memory shared by the plurality of processors and a contention determiner which manages access to the shared memory by each of the plurality of processors. The processors communicate with each other, exchange information regarding completion of an updating process for updating data in the shared memory and information regarding the failure of the updating process. In the case where the updating process is completed by any other one of the processors, each of the processor reads out the updated data. On the contrary, in the case where any other one of the processors fails in executing the updating process, each of the processors executes the updating process for updating data which has not successfully been updated. Having performed the above, each of the processors can access the shared memory in cooperation with each other.

9 Claims, 6 Drawing Sheets

MULTIPROCESSOR SYSTEM, SHARED-MEMORY CONTROLLING METHOD, RECORDING MEDIUM AND DATA SIGNAL EMBEDDED IN A CARRIER WAVE

BACKGROUND OF THE INVENTION

1. Field of the Invention

The present invention relates to a multiprocessor system including a plurality of processors, and, more particularly, to a multiprocessor system, a shared-memory controlling method, a recording medium and a data signal embedded in a carrier wave, for efficiently controlling access to a shared memory by each of the plurality of processors.

2. Description of the Related Art

Conventionally, there are proposed various methods for controlling access to a shared memory in a multiprocessor. For example, Unexamined Japanese Patent Application KOKAI Publication No. H4-291085 discloses a memory accessing technique to be employed in multiprocessor systems.

According to the technique disclosed in Unexamined Japanese Patent Application KOKAI Publication No. H4-291085, a 2-port memory serving as a shared memory and an access-flag area setting the access rights to the shared memory are set on each CPU included in the multiprocessor system. In the multiprocessor system, only one CPU having successfully set an access flag in the access flag area is permitted to access the 2-port memory, so as to reliably realize the access to the shared memory.

Additionally, Unexamined Japanese Patent Application KOKAI Publication No.

H3-054660 discloses a technique regarding a shared-memory management technique to be employed in multiprocessor systems.

In the system disclosed in Unexamined Japanese Patent Application KOKAI Publication No. H3-054660, there are included a priority control circuit which has exclusive control over CPUs and a bus-gate circuit which controls the access to the shared memory by the CPUs. Any of those CPUs which intends to access the shared memory sends a request signal to the priority control circuit. Upon this, the priority control circuit exercises the exclusive control over the CPUs, in accordance with the request signal sent from each of the CPUs, and sends a response signal to either one of the CPUs. After this, the priority control circuit controls a bus gate circuit, and sets the CPU to which the response signal is sent and the shared memory into a state where they can be accessed.

Hence, the multiprocessor system can access the shared memory while preventing to lower the system performance of the multiprocessor system.

The multiprocessor system of this invention, however, has the following problems.

In the conventional multiprocessor system, a recovery process for recovering the failure in updating data in the shared memory and a confirmation process for confirming whether data is updated in the shared memory cannot be carried out in cooperation with each of the processors.

A non-volatile memory, such as a Flash Memory, etc. is employed as the shared memory of the multiprocessor system. Since the flash memory is expensive to buy, many flash memories can not be prepared. In this structure, it is preferred that the data handled by each of the processors be efficiently and centrally managed in the multiprocessor system.

For example, in a multiprocessor system which handles a large volume of service data (e.g. data representing voices, picture images, motion images, etc.) which can be downloaded from an external host computer, it is desired that each of processors efficiently stores and updates the service data in the shared memory in cooperation with each other.

In addition, in the conventional multiprocessor system, the processors can individually be reset.

SUMMARY OF THE INVENTION

The present invention has been made in consideration of the above. It is accordingly an object of the present invention to provide a multiprocessor system, a shared-memory controlling method, a recording medium and a computer data signal, which overcome the problems of the conventional multiprocessor system, and for sending predetermined information between a plurality of processors, so as to execute a recovery process for recovering the failure in updating data in a shared memory and a confirmation process for confirming whether data is updated in the shared memory in cooperation with each other.

Another object thereof is to provide a multiprocessor system, a shared-memory controlling method, a recording medium and a computer data signal, which overcome the problems of the conventional multiprocessor system wherein a plurality of processors can individually be reset.

In order to achieve the above objects, according to the first aspect of the present invention, there is provided a multiprocessor system comprising:

a plurality of processors which send and receive predetermined information to and from each other; and a shared memory which is shared and accessed by the plurality of processors one after another, and wherein each of the plurality of processors requests at least one of other processors included in the plurality of processors to access the shared memory that is to be done by the at least one of other processors, in a case where each of the plurality of processors has accessed the shared memory.

According to this invention, in a case where each of the plurality of processors accesses the shard memory and has updated predetermined data, each of the plurality of processors requests the at least one of other processors to access the shared memory. Upon this, the at least one of other processors re-read the same data as the predetermined data from the shared memory or update the predetermined data in the shared memory. As a result, predetermined information is transmitted between the plurality of processors, and a recovery process for recovering the failure in updating data in the shared memory and a confirmation process for confirming whether data is updated in the shared memory can be performed in cooperation with each other.

Each of the plurality of processors may request, in a case where each of the plurality of processors has normally updated predetermined data in the shared memory, the at least one of other processors to read same data as the predetermined data from the shared memory.

Each of the plurality of processors may request, in a case where each of the plurality of processors has not normally updated predetermined data in the shared memory, the at least one of other processors to update the predetermined data in the shared memory.

In order to achieve the above objects, according to the second aspect of the present invention, there is provided a multiprocessor system comprising:

a plurality of processors which send and receive predetermined information to and from each other;

a shared memory which is shared and accessed by each of the plurality of processors; and an access manager which manages access to the shared memory by each of the plurality of processors, and wherein the access manager selects, in a case where the plurality of processors are in contention to access the shared memory, one of the plurality of processors being in contention and permits the selected processor to access the shared memory, and each of the plurality of processors requests at least one of other processors included in the plurality of processors to access the shared memory that is to be done by the at least one of other processors, in a case where each of the processors is selected by the access manager and the selected processor accesses the shared memory.

According to this invention, in a case where the plurality of processors are in contention for the shared memory, the access manger selects one of the plurality of processors and permits the selected processor to access the shared memory. In the case where each of the processors is selected by the access manager and has updated predetermined data in the shared memory, each of the plurality of processors requests at least one of other processors to access the shared memory. Upon this, the at least one of other processors re-read the same data as the predetermined data from the shared memory, or carry out an updating process for updating the predetermined data in the shared memory. As a result of this, predetermined information is transmitted between the plurality of processors, and a recovery process for recovering the failure in updating the data in the shared memory and a confirmation process for confirming whether data is updated in the shared memory can be done in cooperation with each of the plurality of processors.

Each of the plurality of processors may request, in a case where each of the plurality of processors has normally updated predetermined data in the shared memory, the at least one of other processors to read same data as the predetermined data from the shared memory.

Each of the plurality of processors may request, in a case where each of the plurality of processors has not normally updated predetermined data in the shared memory, the at least one of other processors to update the predetermined data in the shared memory.

Each of the plurality of processors may request, in a case where a predetermined period of time has elapsed without being selected by the access manager, the at least one of other processors and the access manager to perform a predetermined reset operation for resetting themselves.

In order to achieve the above objects, according to the third aspect of the present invention, there is provided a multiprocessor system comprising:

a plurality of processors which send and receive a predetermined signal to and from each other;

a shared memory which is shared and accessed by each of the plurality of processors; and a contention determiner which detects whether the plurality of processors are in contention to access the shared memory, and permits one of the plurality of processors to access the shared memory, and wherein each of the plurality of processors outputs a access-request signal to at least one of other processors included in the plurality of processors, so as to request the at least one of other processors to access the shared memory, in a case where each of the plurality of processors is permitted to access the shared memory by the contention determiner and the permitted processor accesses the shared memory.

According to this invention, in a case where each of the processors is permitted to access the shared memory and update predetermined data in the shared memory, each of the processors requests at least one of other processors included in, the plurality of processors to access the shared memory that should be done by the at least one of other processors. Upon this, the at least one of other processors re-reads the same data as the predetermined data from the shared memory, or executes an updating process for updating the predetermined data in the shared memory As a result of this, predetermined information can be transmitted between each of the plurality of processors, and a recovery process for recovering the failure in updating the predetermined data in the shared memory and a confirmation process for confirming whether the data is updated in the shared memory can successfully be performed in cooperation with each of the plurality of processors.

Each of the processors may output, in a case where each of the processors accesses the shared memory and has normally updated predetermined data therein, a re-read request signal to the at least one of other processors, so as to request the at least one of other processors to read same data as the predetermined data from the shared memory.

Each of the plurality of processors may output, in a case where each of the plurality of processors accesses the shared memory and has not normally updated predetermined data therein, an update-request signal to the at least one of other processors, so as to request the at least one of other processors to update the predetermined data in the shared memory.

Each of the plurality of processors may output a reset-request signal to the at least one of other processors and the contention determiner, so as to request the at least one of other processors and the contention determiner to reset themselves, in a case where a predetermined period of time has elapsed without being selected by the access manager. In this case, each of the plurality of processors can individually be reset.

In order to achieve the above objects, according to the fourth aspect of the present invention, there is provided a shared-memory controlling method to be executed in a multiprocessor system including a plurality of processors which send and receive predetermined information to and from each other, a shared memory which is shared and accessed by each of the plurality of processors, and an access manger which manages access to the shared memory by each of the plurality of processors, and the method comprising:

selecting one processor included in the plurality of processors, and permitting the selected one processor to access the shared memory, in a case where the plurality of processors are in contention for the shared memory;

performing first access to the shared memory using the selected processor;

requesting at least one of other processors included in the plurality of processors to perform second access to the shared memory, in a case where the performing the first access to the shared memory has been done; and performing the second access to the shared memory using the at least one of other processors.

According to this invention, the selecting includes selecting one processor and permits the selected processor to access the shared memory, in a case where the plurality of processors are in contention for the shared memory. The performing the first access includes performing access to the shared memory using the processor selected at the selecting. The requesting includes requesting the at least one of other processors to access the shared memory, in a case where the first access (e.g. including the updating of predetermined information) to the shared memory has been done. The performing the second access includes performing access (including re-reading of same data as the predetermined data from the shared memory and updating the predetermined data in the shared memory, etc.) to the shared memory using the at least one of other processors. As a result of this, predetermined information can be transmitted between each of the plurality of processors, and a recovery process for recovering the failure in updating the predetermined data in the shared memory and a confirmation process for confirming whether data is updated therein can successfully be performed in cooperation with each of the processors.

The requesting may include requesting, in a case where predetermined data has normally been updated in the performing the fist access, the at least one of other processors to read the predetermined data from the shared memory.

The requesting may include requesting, in a case where predetermined data has not normally been updated in the performing the first access, the at least one of other processors to update the predetermined data in the shared memory.

The requesting may include requesting, in a case where a predetermined period of time has elapsed without being selected in the selecting, the at least one of other processors and the access manager to perform a predetermined reset operation for resetting themselves. In this case, each of the plurality of processors can individually be reset.

In order to achieve the above objects, according to the fifth aspect of the present invention, there is provided a shared-memory controlling method comprising:

selecting one of a plurality of processors, and permitting the selected processor to access a shared memory shared by the plurality of processors, in a case where the plurality of processors are in contention for the shared memory;

performing first access to the shared memory using the selected processor;

requesting at least one of other processors included in the plurality of processors to perform second access to the shared memory, in a case where the first access has been done; and performing the second access to the shared memory using the at least one of other processors.

According to this invention, the selecting includes selecting one processor and permitting the selected processor to access the shared memory, in a case where the plurality of processors are in contention for the shared memory. The performing the first access to the shared memory includes performing access to the shared memory using the processor selected at the selecting. The requesting includes requesting at least one of other processors included in the plurality of processors, in a case where the first access (including updating of predetermined data, for example) has been performed to the shared memory. The performing the second access includes performing access (including re-reading of the same data from the shared memory, executing the process for updating the predetermined data in the shared memory, etc.) to the shared memory using the at least one of other processors. As a result of this, the predetermined information can be transmitted between each of the plurality of processors, and the recovery process for recovering the failure in updating the data in the shared memory or a confirmation process for confirming whether the data is updated in the shared memory can successfully be performed.

In order to achieve the above objects, according to the sixth aspect of the present invention, there is provided a computer readable recording medium for controlling a computer to execute a shared-memory controlling method comprising:

selecting one processor included in a plurality of processors, and permitting the selected one processor to access a shared memory, in a case where the plurality of processors are in contention for the, shared memory;

performing first access to the shared memory using the selected processor;

requesting at least one of other processors included in the plurality of processors to perform second access to the shared memory, in a case where the performing the first access to the shared memory has been done; and performing the second access to the shared memory using the at least one of other processors.

In order to achieve the above objects, according to the seventh aspect of the present invention, there is provided a data signal embodied in a carrier wave and representing an instruction sequence for controlling a computer to execute a shared-memory controlling method comprising:

selecting one of a plurality of processors, and permitting the selected processor to access a shared memory shared by the plurality of processors, in a case where the plurality of processors are in contention for the shared memory;

performing first access to the shared memory using the selected processor;

requesting at least one of other processors included in the plurality of processors to perform second access to the shared memory, in a case where the first access has been done; and performing the second access to the shared memory using the at least one of other processors.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A multiprocessor system according to an embodiment of the present invention will now be explained with reference to she accompanying drawings.

In the multiprocessor system of the present invention, each of processors efficiently accesses data stored in a shared memory in cooperation with each other, and executes a predetermined process.

Figure 1:
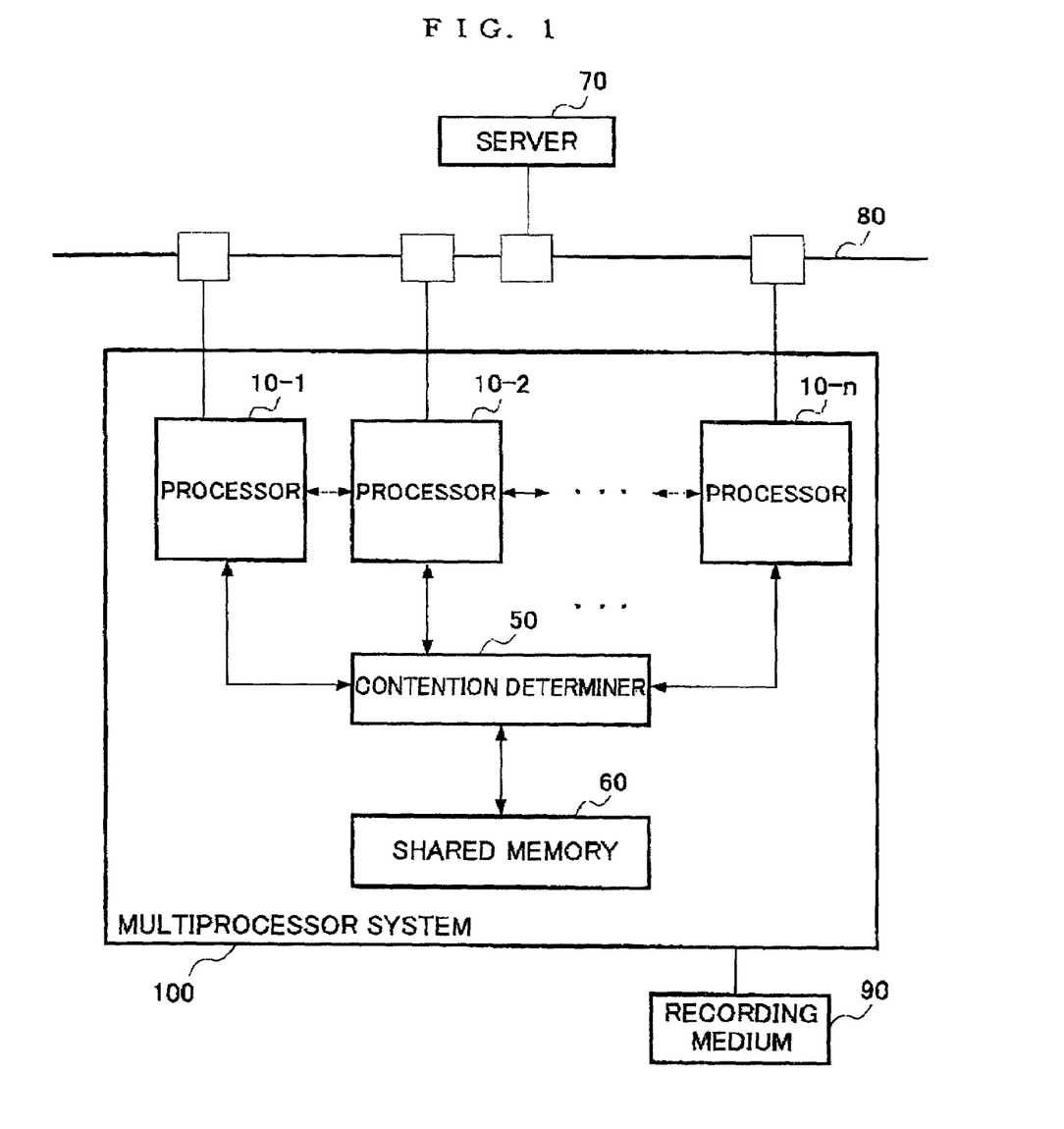
FIG. 1 is a block diagram exemplarily showing the structure of a multiprocessor system according to an embodiment of the present invention.

FIG. 1 is a block diagram exemplarily showing the structure of a system including a multiprocessor system 100 according to the embodiment of the present invention. In this system, the multiprocessor system 100 is connected to a server 70 through a LAN (Local Area Network) 80. The multiprocessor system 100 is connected to a recording medium 90 including a magnetic disk, a semiconductor memory or the like, for example.

As shown in FIG. 1, the multiprocessor system. 100 comprises a plurality of processors 10-1 to 10-n, a contention determiner 50 and a shared memory 60. Each of the processors 10-1 to 10-n is connected to the server 70 through the LAN 80, and appropriately downloads data (service data, etc.) therefrom.

Figure 2:
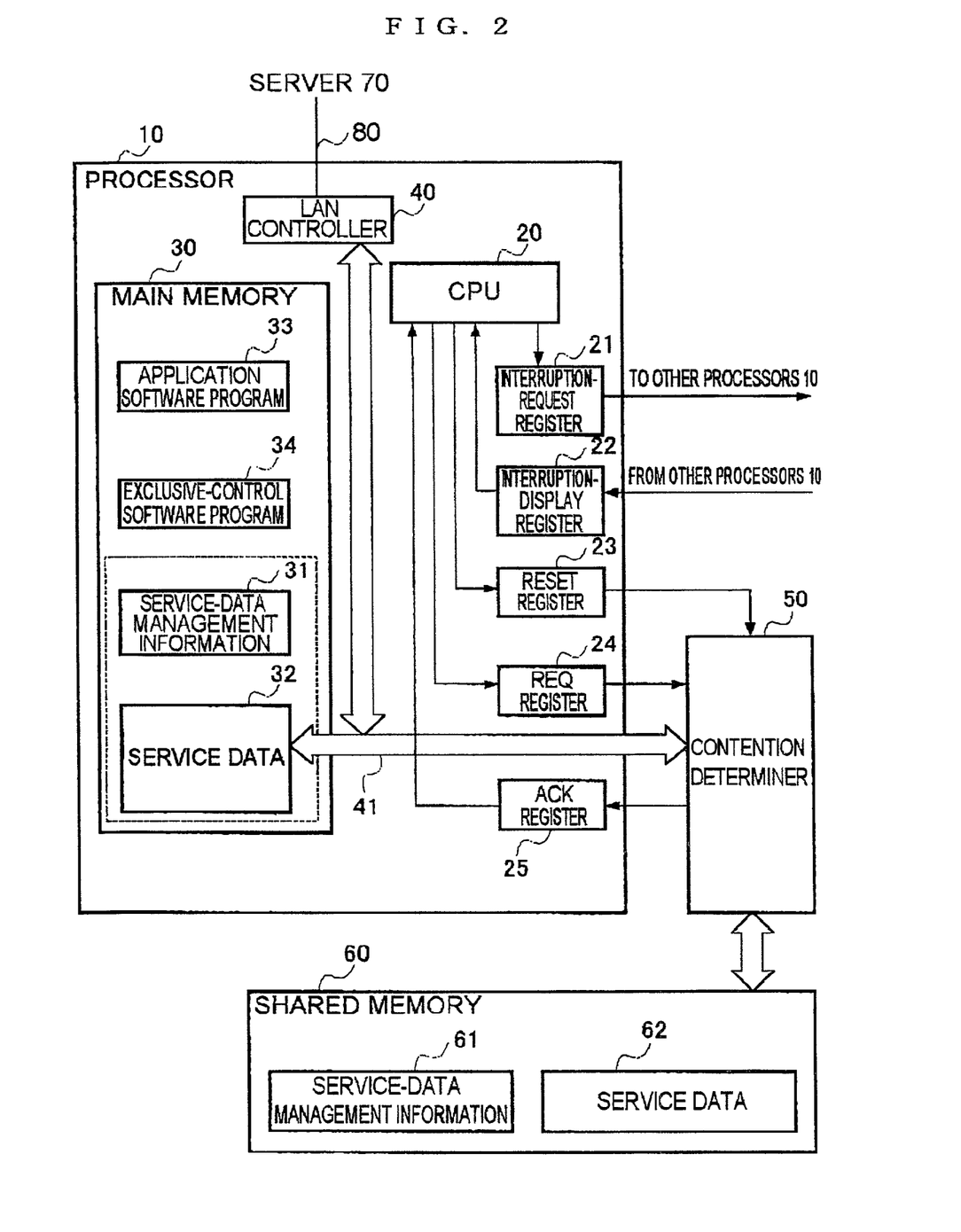
FIG. 2 is a block diagram exemplarily showing the structure of each of a processor, a contention determiner and a shared memory which are included in the multiprocessor system of FIG. 1.

FIG. 2 is a block diagram exemplarily showing the structure of each of the processors 10-1 to 10-n and the shared memory 60, etc.

As shown in FIG. 2, each of the processors 10-1 to 10-n comprises a CPU (Central Processing Unit) 20, an interruption-request register 21, an interruption-display register 22, a reset register 23, an REQ register 24, an ACK register 25, a main memory 30, an LAN controller 40 and a system bus 41.

The CPU 20 reads out and executes an application software program 33 and an exclusive-control software program 34 which are stored in the main memory 30, and entirely controls the processor 10.

The interruption-request register 21 of one of the processors 10-1 to 10-n is controlled by the CPU 20 executing the exclusive-control software program 34, and sends various request information to other processors 10-1 to 10-n. Specifically, the interruption-request register 21 of one of the processors 10-1 to 10-n sends, to other processors 10-1 to 10-n, request information for requesting to re-read service data 62 stored in the shared memory 60 or request information for requesting to update the service data 62.

The interruption-display register 22 of one of the processors 10-1 to 10-n receives various request information sent from other processors 10-1 to 10-n (the interruption-request register 21 of other processors 10-1 to 10-n). Upon reception of the request information from one of the processors 10-1 to 10-n, the interruption-display register 22 of each of other processors 10-1 to 10-n causes the CPU 20 to begin a corresponding interruption process. Specifically, in response to the received request information, the interruption-display register 22 outputs an instruction signal for activating an interruption handler (an interruption handler program 36, as will be explained later) included in the exclusive-control software program 34, to the CPU 20.

The reset register 23 is controlled by the CPU 20 executing the exclusive-control software program 34, and sends information for requesting to reset other processors 10-1 to 10-n, to the contention determiner 50. That is, the reset register 23 sends request information for requesting to reset other processors 10-1 to 10-n, to the contention determiner 50.

The REQ register 24 is controlled by the CPU 20 executing the exclusive-control software program 34, and sends information for requesting to access the shared memory 60, to the contention determiner 50. Specifically, the REQ register 24 sends information "1" (ON information) to the contention determiner 50 when requesting to access the shared memory 60, and sends information "0" (OFF information) to the contention determiner 50 when accessing of the shared memory 60 is completed.

The ACK register 25 receives access-permission information sent from the contention determiner 50, and provides the CPU 20 with the received access-permission information. Specifically, the ACK register 25 receives the information "1" (ON information) representing that it is permitted to access the shared memory 60, from the contention determiner 50, and supplies the CPU 20 with the received information.

In the case where two or more processors 10-1 to 10-n are in contention for the shared memory 60, the contention determiner 50 selects one of the contending processors 10-1 to 1-n, and sends information "1" to the ACK register 25 of the selected processor 10.

The main memory 30 includes, for example, a DRAM (Dynamic Random Access Memory), and stores service-data management information 31, the service data 32, the application software program 33 and the exclusive-control software program 34.

The service-data management information 31 is information for managing the service data 32, and read out from the shared memory 60.

The service data 32 is target data to be processed in its processor 10, and read out from the shared memory 60.

The application software program 33 is a program for executing a predetermined process in its processor 10, and executed by the CPU 20.

The exclusive-control software program 34 is a program for executing an exclusive control process in its processor 10, and executed by the CPU 20.

The CPU 20 executing the exclusive-control software program 34 performs exclusive control for the shared memory 60 in association with other processors 10-1 to 10-n, in cooperation with the REQ register 24, the ACK register 25 and the contention determiner 50. The CPU 20 executing the exclusive-control software program 34 executes a recovery process for recovering the contention determiner 50 in cooperation with the interruption-request register 21, the interruption-display register 22 and the reset register 23, in the case where the contention determiner 50 is in an abnormal condition.

Figure 3:
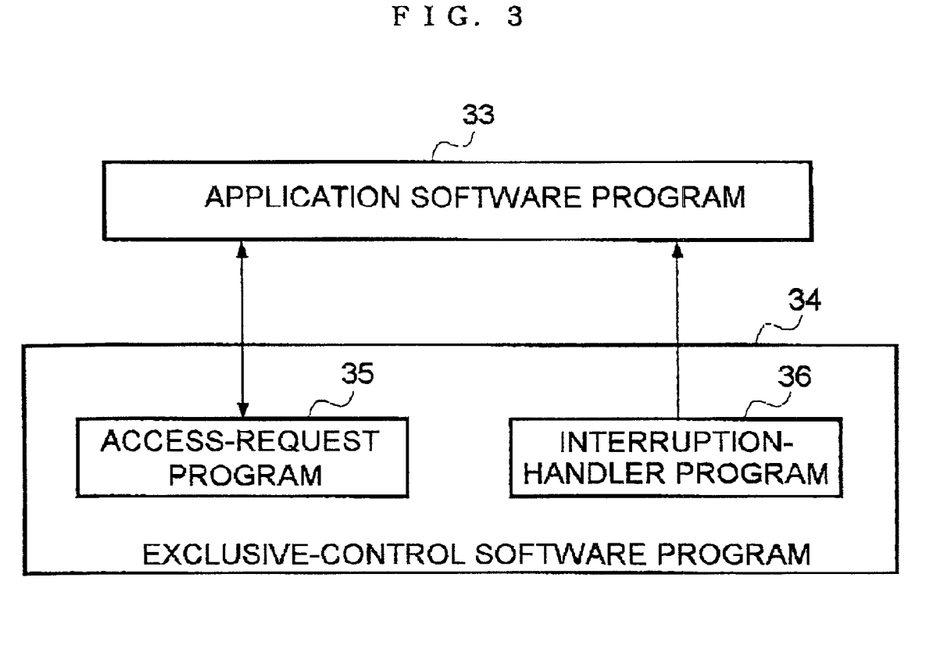
FIG. 3 is an exemplary diagram for explaining the relationship between software programs which are executed in each processor shown in FIG. 2.

In more particular, as shown in FIG. 3, the exclusive-control software program 34 includes an access-request program 35 and an interruption-handler program 36.

The access-request program 35 is a program for receiving a request for accessing the shared memory 60 from the application software program 33 and for sending thus received request to other processors 10-1 to 10-n.

The interruption-handler program 36 is a program for receiving a request, etc. sent from other processors 10-1 to 10-n and for sending thus received request to the application software program 33.

As shown in FIG. 2, the LAN controller 40 controls communications between the processor 10 and the server 70 which are connected with each other through the LAN 80. The processor 10 downloads the service data, etc. from the server 70 to the shared memory 60, etc., using this LAN controller 40.

The system bus 41 connects the LAN controller 40 with the main memory 30, etc. within its processor 10, and connects also the main memory 30 with the contention determiner 50, etc. In this structure, the memory 30 can be connected with the shared memory 60, and the processor 10 can send and receive service data, etc. through the contention determiner 50.

In the case where two or more processors 10-1 to 10-n are in contention for the shared memory 60, the contention determiner 50 selects one of the contending processors 10-1 to 10-n, and permits the selected processor 10 to access the shared memory 60.

The shared-memory 60 is a memory shared by the processors 10-1 to 10-n, and includes a flash memory, etc. The shared-memory 60 stores the service data 62, which is the data each of the processors 10-1 to 10-n downloaded from the server 70, and service data management information 61, for managing the service data 62.

In the multiprocessor system 100 having the above structure, predetermined information is transmitted between the plurality of processors 10-1 to 10-n, thereby a recovery process, a confirmation process, etc. can be performed in cooperation with each other.

Operations of the multiprocessor system 100 according to the embodiment of the present invention will now be described with reference to FIGS. 4A, 4B and 5.

Figure 4A:
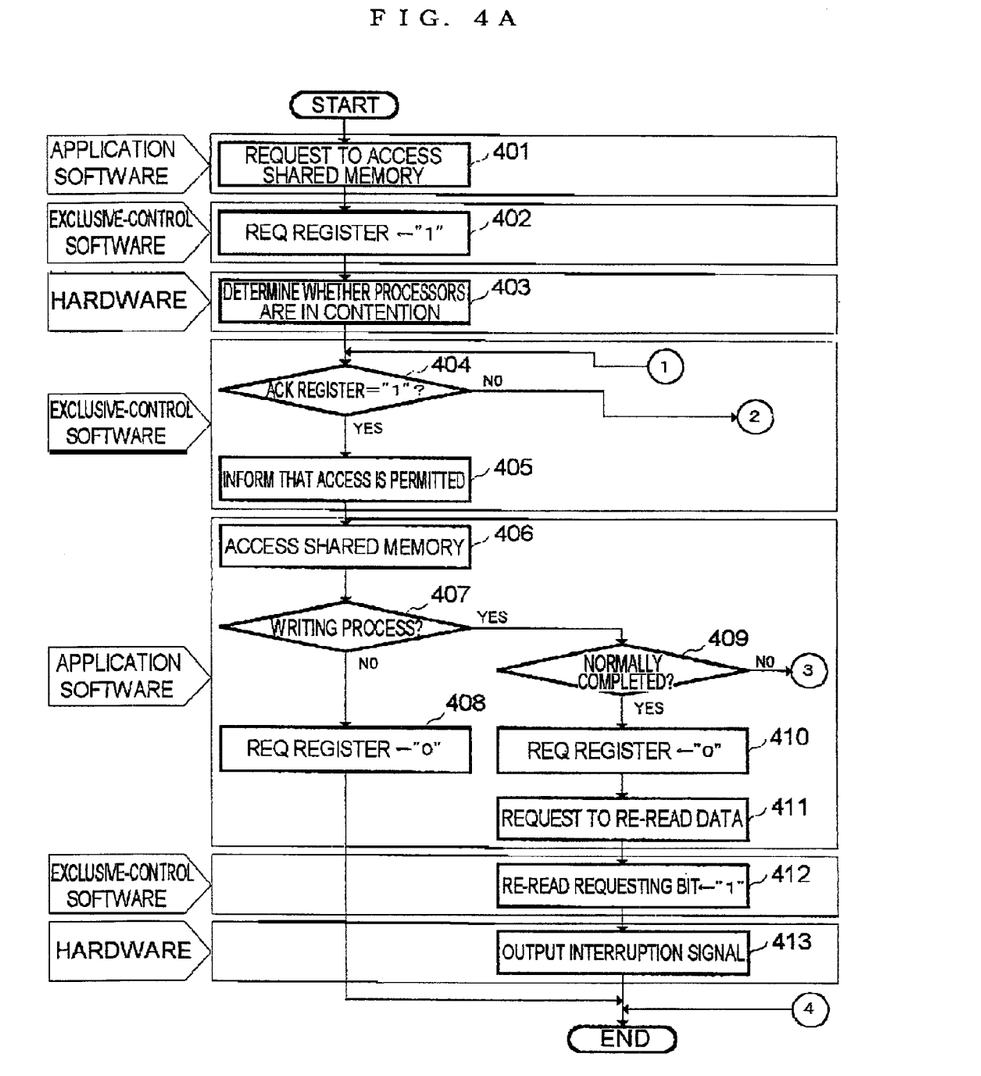
FIGS 4A and 4B are flowcharts for explaining an accessing process carried out by the multiprocessor system of FIG. 1.
Figure 4B:
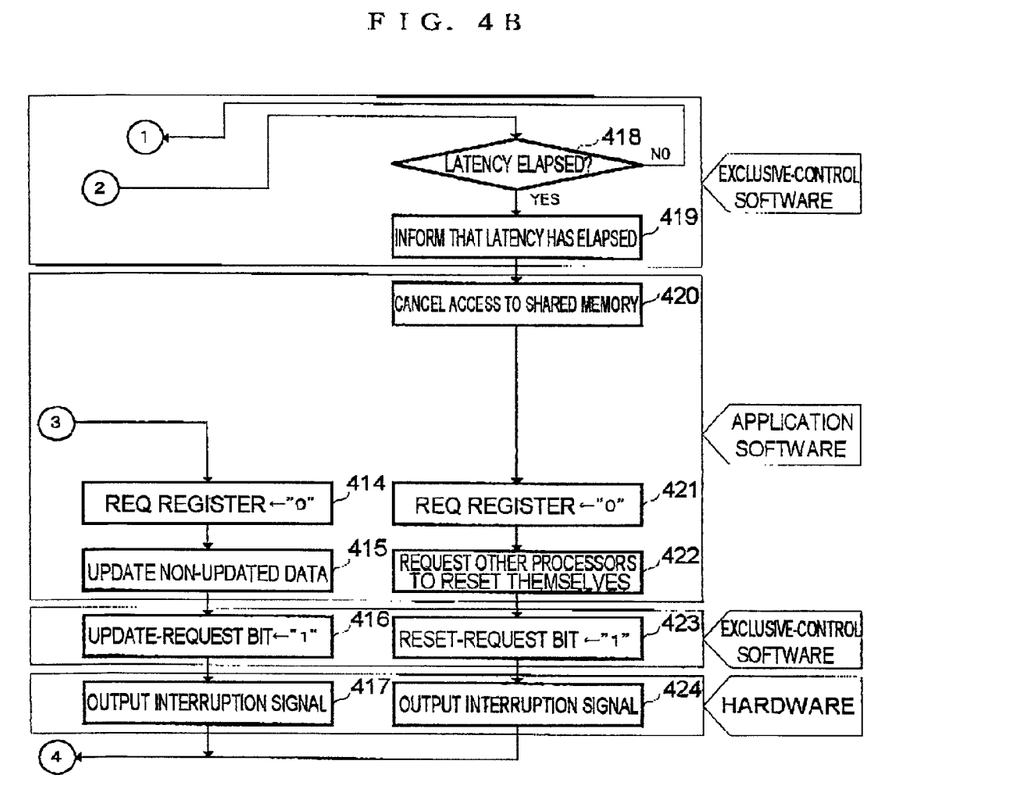

FIGS. 4A and 4B are flowcharts for explaining an accessing process which is carried out by the multiprocessor system 100 in accordance with the access-request program 35. FIG. 5 is a flowchart for explaining an interruption process carried out by the multiprocessor system 100.

The accessing process will now be explained with reference to FIGS. 4A and 4B.

As shown in FIG. 4A, if a request for accessing the shared memory 60 is issued in the application software program 33, the exclusive-control software program 34 is activated (Step S401). In more particular, the access-request program 35 included in the exclusive-control software program 34 is activated.

Upon reception of the request for accessing, the activated access-request program 35 sets "1" in the REQ register 24 to request for accessing the shared memory 60 (Step S402). That is, the REQ register 24 sends information "1" (ON information) to the contention determiner 50.

The contention determiner 50 determines whether two or more of the processors 10-1 to 10-n are in contention for the shared memory 60, in accordance with the information sent form the REQ register 24 of each of the processors 10-1 to 10-n, and sends information to the ACK register 25 of one of the processors 10-1 to 10-n (Step S403). That is, in the case where it is determined that the processors 10-1 to 10-n are in contention for the shared memory 60, the contention determiner 50 selects one of the processors 10-1 to 10-n, and permits the selected processor 10 to access the shared memory 60 in accordance with predetermined conditions.

On the contrary, in the case where it is determined that the processors 10-1 to 10-n are not in contention for the shared memory 60, the contention determiner 50 permits the requesting processor 10 to access the shared memory 60. The contention determiner 50 sets "1" in the ACK register 25 of the requesting processor 10.

The access-request program 35 of the exclusive-control software program 34 occasionally monitors the value of the ACK register 25 included in its processor 10, and determines whether the value of the ACK register 25 is "1" (Step S404).

In the case where it is determined that the value of the ACK register 25 is not "1", the access-request program 35 go on to Step 418 of the process shown in FIG. 4B. On the contrary, in the case where it is determined that the value of the ACK register 25 is "1", the access-request program 35 informs the application software program 33 of the access permission (Step S405).

The application software program 33 performs accessing the shared memory 60 (Step S406).

The application software program 33 determines whether the process for accessing the shared memory 60 is a process for writing data thereinto (Step S407).

In the case where it is determined that the process for accessing the shared memory 60 is not the process for writing data thereinto, the application software program 33 sets the value of the REQ register 24 to "0" when the accessing is completed (Step S408). In this case, the accessing toward the shared memory 60 is completed without modifying the data stored in the shared memory 60.

In the above step S407, in the case where it is determined that the accessing toward the shared memory 60 is performed for writing data thereinto, the application software program 33 determines whether the accessing process is normally terminated (Step S409).

In the case where it is determined that the accessing is not normally terminated (i.e., the accessing is terminated abnormally), the application software program 33 go on to Step S414 shown in FIG. 4B, as will be explained later. In the case where it is determined that the accessing is terminated normally, the application software program 33 sets the value of the REQ register 24 to "0" (Step 3410), and requests other processors 10-1 to 10-n to re-read the updated data (Step S411). That is, the application software program 33 sends re-read requesting information to the exclusive-control software program 34 included in the same processor 10, to control the main memory 30 of each of other processors 10-1 to 10-n to write the service data 62 and service-data management information 61 updated by the application software program 33.

The exclusive-control software program 34 sets "1" in a re-read-requesting bit of the interruption-request register 21, and sends the re-read request to other processors 10-1 to 10-n (Step S412).

Upon reception of the re-read request, the interruption-display register 22 of each of other processors 10-1 to 10-n outputs an interruption signal for instructing its CPU 20 to re-read the updated data (Step S413).

In the above-described Step S409, in the case where it is determined that the accessing is not normally terminated (i.e., terminated abnormally), the flow advances the process of FIG. 4B, and the application software program 33 sets the value of the REQ register 24 to "0" (Step S414). Further, the application software program 33 sends update-request information to the exclusive-control software program 34 included in the same processor 10, to control other processors 10-1 to 10-n to update the non-updated service data 62 and service-data management information 61 for the application software program 33 that could not update the data (Step S415).

The exclusive-control software program 34 sets "1" in an update-request bit of the interruption-request register 21, and sends an update request for requesting other processors 10-1 to 10-n to update the non-updated data (Step S416).

Upon reception of the update-request, the interruption-display register 22 of each of other processors 10-1 to 10-n outputs, to the CPU 20 included in the same processor 10, an interruption signal for instructing the CPU 20 to update the service data 62 and service-data management information 61 (Step S417).

In the step 404 shown in FIG. 4A, in the case where it is determined that the value of the ACK register 25 is not "1", the access-request program 35 included in the exclusive-control software program 34 determines whether a predetermined latency time has elapsed (Step S418).

In the case where it is determined that the predetermined latency time has not elapsed, the access-request program 35 returns back to the above step S404 shown in FIG. 4A. On the contrary, in the case where it is determined that the predetermined latency time has elapsed, the access-request program 35 informs the application software program 33 that the predetermined latency time has elapsed (Step S419).

The application software program 33 cancels the access toward the shared memory 60 (Step S420), sets the REQ register 24 to "0" (Step S421), and requests other processors 10 to reset themselves (Step S422).

The exclusive-control software 34 sets "1" in the reset-request bit of the interruption-request register 21, and sends other processors 10 a reset request for resetting themselves (Step S423).

Upon reception of the request from the exclusive-control software 34, the interruption-display register 22 included in each of other processors 10-1 to 10-n outputs an interruption signal, to the CPU 20 included in the same processor 10, for instructing the CPU 20 to reset the processor 10 (Step S424).

An interruption process will now be explained with reference to FIG. 5.

The CPU 20 receives an interruption signal (Step S501) which has been output at any of the steps S413, S417 and S424 of FIGS. 4A and 4B.

Upon reception of the interruption signal, the exclusive-control software program 34, more particularly the interruption handler program 36 included in the exclusive-control software program 34, is activated (Step S502).

The activated interruption handler program 36 detects bits of a signal (a plurality of bits) output from the interruption-display register 22, and checks the contents of the received interruption signal (Step S503).

In the case where the contents of the received interruption signal is a request for re-reading the service data 62, etc., the interruption display register 22 clears the interruption signal (S504), and sends a re-read request to the application software program 33 (Step S505). That is, the interruption handler program 36 informs the application software program 33 that there is sent a request for re-reading the service data 62, etc. from other processors 10-1 to 10-n.

The application software program 33 reads out the service-data management information 61 from the shared memory 60 (Step S506), reads out only the updated service data 62 based on the read information, and updates the read data in the main memory 30 (Step S507).

In the above-described step S503, in the case where it is determined that the contents of the interruption signal represents a request for updating the data, the interruption handler program 36 clears the interruption signal (Step S508), and sends an update request for updating the data to the application software program 33 (Step S509). That is, the interruption handler program 36 informs the application software program 33 that there is sent an update request from other processors 10-1 to 10-n.

The application software program 33 downloads data from the server 70 for other processors 10-1 to 10-n, and updates the service data 62, etc. stored in the shared memory 60 (Step S510).

In the above-described step S503, in the case where it is determined that the contents of the interruption signal represent a request for resetting the processor 10, the interruption handler program 36 clears the interruption signal (Step 5511), and sets "1" in the reset register 23 (Step S512).

In the case where "1" is set in the reset register 23, the hardware included in each processor 10 resets itself (Step S513). That is, the contention determiner 50 forces itself to be reset, and each of the processors 10-1 to 10-n resets the REQ register 24 and ACK register 25.

As explained, in the multiprocessor system 100 having the above structure, predetermined information is transmitted between the plurality of processors 10-1 to 10-n, thereby a recovery process for recovering data upon failure of updating data in the shared memory 60 and a confirmation process for confirming whether data is to be updated in the shared memory 60, etc. can be performed in cooperation with each other. In the structure where each of the processors 10-1 to 10n includes a reset register for, instructing to reset the processor 10, each processor can be reset.

As a result, predetermined information is transmitted between the plurality of processors, and a recovery process for recovering the failure in updating data in the shared memory and a confirmation process for confirming whether data is updated in the shared memory can be achieved in cooperation with each other.

In the above embodiment, in the accessing process (Steps S404 and S418) shown in FIGS. 4A and 4B, the value of the ACK register 25 is frequently monitored, and a response (access permission) from the contention determiner 50 is checked based on the value of the ACK register 25. However, how to check the response from the contention determiner 50 is arbitrary.

For example, when a response is sent from the contention determiner 50, an interruption signal is generated, and the value of the ACK register is checked in accordance with the generated interruption signal, so as to check the response from the contention determiner 50.

In the above embodiment, data is downloaded from the server 70 in the interruption process (Step S510) shown in FIG, 5, and the service data 62, etc. stored in the shared memory 60 is updated. However, in the case of failure in downloading data from the server 70, the service data 32, etc. stored in the main memory 30 may be updated back into the form of the service data 62 in the shared-memory 60.

For example, in the case where the downloading of the data from the server 70 has not been successful, it can be assumed that an undesired event occurs between the server 70 and the processor 10. In this case, there is no use in performing data communications with the server 70, and an abnormality of the service data 62 stored in the shared memory 60 cannot be recovered.

Hence, in the case where the downloading is not successfully achieved, the application software program 33 abandons the downloading from the server 70, and updates the service data 32 in the main memory 30 back into the service data 62 of the shared memory 60. In this structure, after the server 70 is activated again next time, a normal process of downloading data from the server 70 can be achieved.

Figure 5:
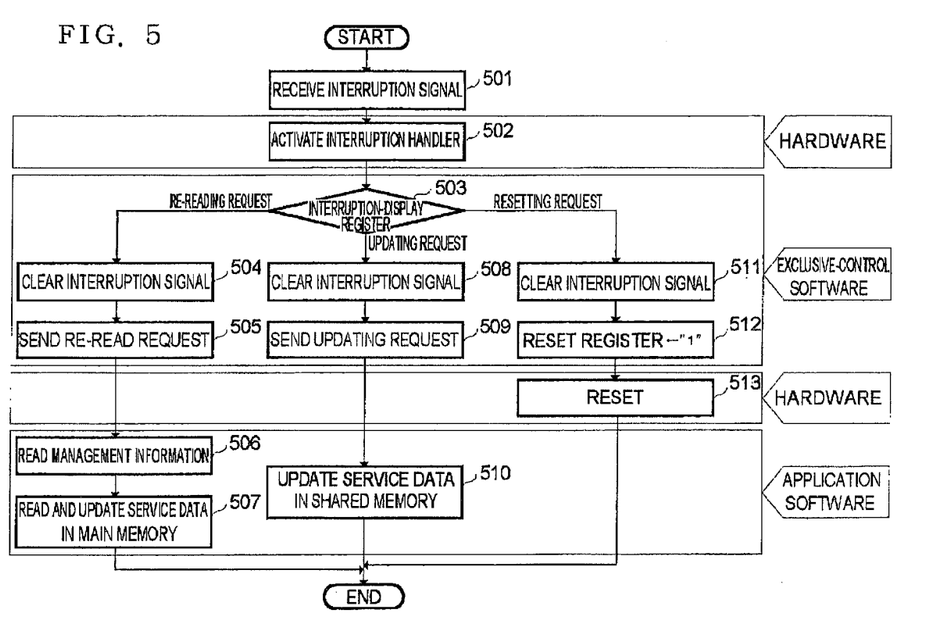
FIG. 5 is a flowchart for explaining an interruption process carried out by the multiprocessor system of FIG. 1.

In the above embodiment, in the interruption process (Step S513) shown in FIG. 5, the processor 10 resets the REQ register 24 and the ACK register 25. At the same time, a process for resetting the software inside each processor 10 can be executed. This is because the software inside each processor 10 may be reset as a result of being out of control. In this case, the software inside each processor 10 is reset, and then the REQ register 24 and ACK register 25 are reset afterwards.

The multiprocessor system 100 according to the above embodiment is not limited to a system for downloading data from the server 70, etc. The multiprocessor system 100 can be employed for a system (an Embedded System) which is embedded in various units, etc.

The multiprocessor system according to the embodiment of the present invention can realize a function for selecting one processor 10 that is permitted to access the shared memory in contention with other processors 10-1 to 10-n and any other functions, in their hardware-like form. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention in its software-like form. The above program and data may be stored in a disk device or the like in the server device on the Internet, and embedded in a carrier wave. The program and data embedded in the carrier wave may be downloaded into the computer so as to realize the system of the present invention.

The exclusive-control software program 34, the access-request program 35, the handler program 36 and any other functions which are recorded in the main memory 30 of each of the processors 10-1 to 10-n may be realized in their hardware-like form.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-043855 filed on Feb. 20, 2001, and including specification, claims, drawings and summary. The disclosure of the above Japanese Patent Application is incorporated herein by reference in its entirety.

What is claimed is:

1. A multiprocessor system comprising:
a plurality of processors which send and receive predetermined information to and from each other;
a shared memory which is shared and accessed by each of said plurality of processors; and
an access manager which manages access to said shared memory by each of said plurality of processors,
wherein, when said plurality of processors are in contention to access said shared memory, said access manager selects one of said plurality of processors and permits said one of said plurality of processors to access said shared memory,
wherein, once each of said plurality of processors has accessed said shared memory, when said one of said plurality of processors updates a predetermined data in said shared memory, said one of said plurality of processors requests others of said plurality of processors to access said updated predetermined data from said shared memory, and
wherein, when a predetermined period of time has elapsed without being selected by said access manager, said one of said plurality of processors requests others of said plurality of processors and said access manager to perform a predetermined reset operation for resetting themselves.

2. The multiprocessor system according to claim 1, wherein said one of said plurality of processors requests others of said plurality of processors to update said updated predetermined data from said shared memory.

3. The multiprocessor system according to claim 1, wherein said one of said plurality of processors requests others of said plurality of processors to update the predetermined data in said shared memory, when said others of said plurality of processors have not yet updated said predetermined data.

4. A multiprocessor system comprising:
a plurality of processors which send and receive a predetermined signal to and from each other;
a shared memory which is shared and accessed by each of said plurality of processors; and
a contention determiner which detects whether said plurality of processors are in contention to access said shared memory, and permits one of said plurality of processors to access said shared memory,
wherein, once said one of said plurality of processors has accessed said shared memory said one of said plurality of processors outputs an access-request signal to another one of said plurality of processors, so as to request said another one of said plurality of processors to access said shared memory, and
wherein once each of said plurality of processors has accessed said shared memory, when said one of said plurality of processors updates a predetermined data in said shared memory, said one of said plurality of processors outputs a re-read request signal to another of said plurality of processors, so as to request said others of said plurality of processors to access said updated predetermined data from said shared memory, and
wherein, when a predetermined period of time has elapsed without being selected by said access manager, said one of said plurality of processors outputs a reset-request signal to said others of said plurality of processors, and said contention determiner, so as to request said others of said plurality of processors and said contention determiner to reset themselves.

5. The multiprocessor system according to claim 4, wherein said one of said plurality of processors outputs an update-request signal, so as to request said others of said plurality of processors to update said updated predetermined data from said shared memory.

6. The multiprocessor system according to claim 4, wherein said one of said plurality of processors outputs an update-request signal, so as to request said others of said plurality of processors to update the predetermined data in said shared memory, when said others of said plurality of processors have not yet updated said predetermined data.

7. A shared-memory controlling method to be executed in a multiprocessor system including a plurality of processors which send and receive predetermined information to and from each other, a shared memory which is shared and accessed by each of said plurality of processors, and an access manager which manages access to said shared memory by each of said plurality of processors, said method comprising:
selecting one processor of said plurality of processors, and permitting said one processor to access said shared memory, when said plurality of processors are in contention for said shared memory;
performing a first access to said shared memory using said one processor;
requesting others of said plurality of processors to perform a second access to said shared memory, when said performing the first access to said shared memory has been done; and
performing the second access to said shared memory using said others of said plurality of processors,
wherein, once each of said plurality of processors has accessed said shared memory, said one processor updates a predetermined data in said shared memory and requests said others of said plurality of processors to access said updated predetermined data from said shared memory, and wherein, when a predetermined period of time has elapsed without being selected in said selecting step, said requesting step includes requesting said others of said plurality of processors and said access manager to perform a predetermined reset operation for resetting themselves.

8. The shared-memory controlling method as claimed in claim 7, wherein said requesting step includes said one processor requesting others of said plurality of processors to update said updated predetermined data in said shared memory.

9. The shared-memory controlling method according to claim 7, wherein said requesting step includes said one processor requesting others of said plurality processors to update the predetermined data in said shared memory.

\* \* \* \* \*